United States Patent [19]
Bay et al.

[11] Patent Number: 5,481,876
[45] Date of Patent: Jan. 9, 1996

[54] INLET SCREEN FOR TRACTOR HYDRAULIC SYSTEM

[75] Inventors: Tod A. Bay, Denver; Norman M. Stauffer, New Holland, both of Pa.; Roy A. Bittner, Lisbon, Iowa

[73] Assignee: New Holland North America, Inc., New Holland, Pa.

[21] Appl. No.: 318,306

[22] Filed: Oct. 5, 1994

[51] Int. Cl.[6] .......................... F16D 31/02; B01D 24/00
[52] U.S. Cl. ................................. 60/454; 210/185
[58] Field of Search ............... 60/453, 454; 210/470, 210/167, 172, 185, 171

[56] References Cited

U.S. PATENT DOCUMENTS

| | | | |
|---|---|---|---|
| 3,411,293 | 11/1968 | Akins | 60/454 |
| 3,945,208 | 3/1976 | O'Connor | 210/172 X |
| 4,053,409 | 10/1977 | Kuhfuss | 210/172 X |
| 4,126,553 | 11/1978 | Berg | 210/172 X |
| 4,510,051 | 4/1985 | Diry | 210/185 X |
| 4,921,600 | 5/1990 | Meissner | 210/470 X |

Primary Examiner—Edward K. Look
Assistant Examiner—Hoang Nguyen
Attorney, Agent, or Firm—Larry W. Miller; Frank A. Seemar

[57] ABSTRACT

A screen member for the hydraulic system of an agricultural tractor is disclosed wherein the screen member is formed with a threaded opening to permit mounting thereof on a stationary stud fixed to the interior wall of the hydraulic system reservoir. The screen member is sealed against the stationary stud by a sealing washer and against the opposing reservoir wall by an O-ring surrounding an access opening through which filtered hydraulic fluid is drawn from the interior of the screen member. The screen member is also formed with a handle projectable through the access opening in the reservoir to facilitate the rotation of the screen member for mounting on the stationary stud. The handle can be formed with an optional square opening for engagement with a standard rachet head to effect rotation of the screen member.

9 Claims, 3 Drawing Sheets

5,481,876

INLET SCREEN FOR TRACTOR HYDRAULIC SYSTEM

BACKGROUND OF THE INVENTION

This invention relates generally to off-road motor vehicles, such as tractors, and more particularly, to a closed center hydraulic system providing hydraulic power for operating the tractor steering mechanism, the three-point lift mechanism and the remote directional valves for operatively powering implements coupled to the tractor.

Agricultural tractors are typically provided with a plurality of directional remote valves for the connection of hydraulic lines thereto for the operative powering from the tractor's hydraulic system the hydraulic components of an implement attached to the tractor. The tractor hydraulic system is also utilized to provide hydraulic power for the operation of certain on-board hydraulic components, such as the tractor's steering mechanism and the three-point lift linkage. The various hydraulically powered components require different demands on the hydraulic system, which must be configured to adapt to the different hydraulic demands.

Within the tractor on-board hydraulic system, and also within the hydraulic components driven from the tractor on-board hydraulic system, are mechanical devices, such as gears, that can become damaged during their operation. When such devices are damaged, metal chips typically enter the flow of hydraulic fluid and can contaminate other mechanical devices, causing further damage and additional contamination of the hydraulic system. Filters and screens are normally provided within the flow path of hydraulic fluid within the system to remove such contaminates. The servicing of hydraulic system filters and screens is often cumbersome due to the location of the screens, which is particularly true with agricultural tractors.

The reservoir or sump for the hydraulic system on agricultural tractors is usually located within the center gear hosing for the rear drive axle, so as to provide lubrication for the drive gears transferring rotational power from the drive shaft operably driven from the engine to the rear drive wheels of the tractor, as well as provide a large reservoir for the hydraulic system. It would be desirable to provide a screen mechanism for the removal of large contaminates from the hydraulic system of an agricultural tractor that facilitates the installation and removal of the screen member.

SUMMARY OF THE INVENTION

It is an object of this invention to overcome the aforementioned disadvantages of the prior art by providing an easily accessible screen member for the hydraulic system for tractors.

It is another object of this invention to provide a more convenient method of servicing the screen for the on-board tractor hydraulic system.

It is an advantage of this invention that the screen member can be easily access from externally of the hydraulic reservoir.

It is a feature of this invention that the screen maintains a static seal between the filtered and unfiltered hydraulic fluid within the hydraulic system reservoir.

It is another feature of this invention that the screen member is formed with a threaded opening to be mounted on a stationary stud fixed to the wall of the reservoir.

It is another advantage of this invention that the screen member is sealed against the stationary stud by a sealing washer and thread sealant between the mating threads of the screen member and the stationary stud.

It is still another advantage of this invention that the screen member is sealed against the reservoir wall opposite the stationary stud mounting to provide a static seal allowing the withdrawal of filtered hydraulic from the interior of the screen member.

It is still another feature of this invention that the screen member is provided with a handle to facilitate a rotation of the screen member for mounting thereof on the stationary stud.

It is yet another feature of this invention that the handle of the screen member is provided with a square hole therethrough for engagement with a ratchet head to effect a rotation of the screen member.

It is a further object of this invention to provide a screen member for the hydraulic system of an agricultural tractor which is durable in construction, inexpensive of manufacture, carefree of maintenance, facile in assemblage, and simple and effective in use.

These and other objects, features and advantages are accomplished according to the instant invention by providing a screen member for the hydraulic system of an agricultural tractor is disclosed wherein the screen member is formed with a threaded opening to permit mounting thereof on a stationary stud fixed to the interior wall of the hydraulic system reservoir. The screen member is sealed against the stationary stud by a sealing washer and against the opposing reservoir wall by an O-ring surrounding an access opening through which filtered hydraulic fluid is drawn from the interior of the screen member. The screen member is also formed with a handle projectable through the access opening in the reservoir to facilitate the rotation of the screen member for mounting on the stationary stud. The handle can be formed with an optional square opening for engagement with a standard rachet head to effect rotation of the screen member.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
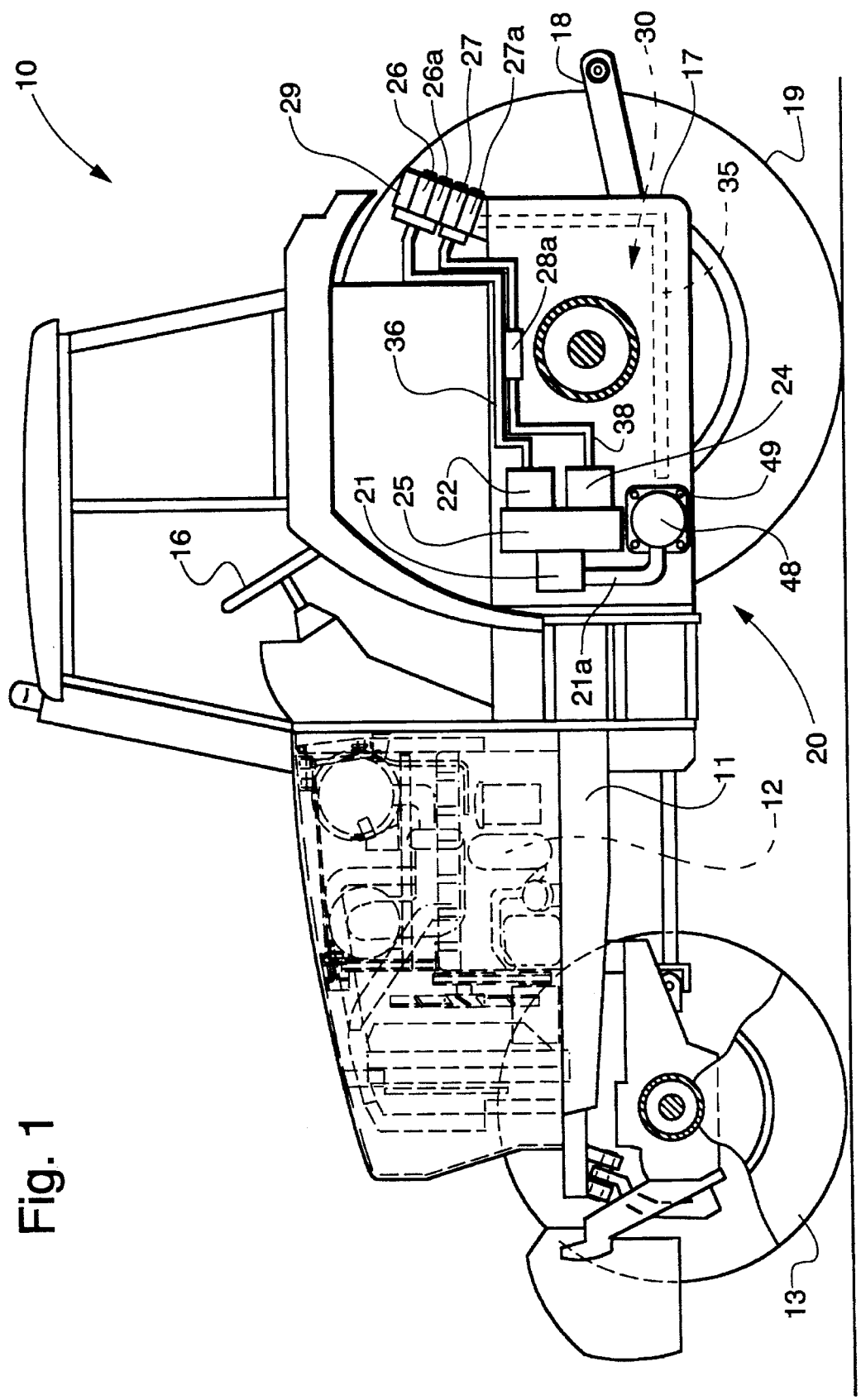
FIG. 1 is a side elevational view of a tractor incorporating the principles of the instant invention, the front and rear wheels being broken away for purposes of clarity, the engine being depicted in broken lines.

Referring now to the drawings and, particularly, to FIG. 1, a representative view of an agricultural tractor incorporating the principles of the instant invention can best be seen. Left and right references are used as a matter of convenience and are determined by standing at the rear of the tractor and facing the forward end in the normal direction of travel. The tractor 10 includes a chassis 11 supported above the ground G in a conventional manner by forward steerable wheels 13 and rearward drive wheels 19 rotatably mounted in a customary transversely spaced orientation and houses a conventional engine 12 serving to provide operational power for the tractor 10 and an operator's cab 15 positioned in an elevated location from which an operator can control the operation of the tractor 10. The operator's cab 15 includes a steering wheel 16 to operate the steering of the front wheels 13 in a known manner through hydraulic steering cylinders (not shown).

Referring now to all the FIGS., the tractor on-board hydraulic system 20 is located adjacent the rear drive wheels 19 of the tractor 10 and includes a constant displacement, gear driven charge pump 21 and a pair of closed center, load sensing, variable displacement piston pumps 22, 24 all driven in a conventional manner from the engine 12. The drive gear casing 25 for these pumps 21, 22 and 24 contain a drive gear train (not shown) to provide operative power for driving the pumps 21, 22 and 24. The gear driven charge pump 21 will provide a sufficient flow to satisfy the maximum requirements of both the piston pumps 22, 24, which are preferably sized to provide maximum flows of approximately 25 and 32 gallons per minute, respectively.

The tractor 10 is provided with a plurality of conventional remote directional valves 26, 26a, 27 and 27a, which are provided with couplings, preferably of the quick-attach variety, for the connection of hydraulic devices to be powered from the tractor hydraulic system 20. Exemplary of such remote hydraulic devices would be implements (not shown) attached in a conventional manner to the rear of the tractor 10 to be towed thereby. Such implements typically have hydraulic cylinders (not shown) or hydraulic motors (not shown) for operating a particular function of the implement. These hydraulic cylinders or motors would be connected via one or more of the remote valves 26, 26a, 27 or 27a to receive a supply of hydraulic fluid under pressure for powering the operation of the device.

The tractor 10 also includes hydraulically driven devices to be powered from the on-board hydraulic system 20. For example, the conventional steering mechanism (not shown) which is actuated by a turning of the steering wheel 16 can effect a pivotal movement of the front steering wheels 13 via a hydraulic steering cylinder (not shown). For a more detailed description of the steering mechanism, reference can be had to U.S. Pat. No. 5,312,124, issued on May 17, 1994, to G. W. Linde, et al, the reference. The flow of hydraulic fluid to the steering cylinder (not shown) is controlled through a steering valve 28, which is operatively connected to the steering wheel 16.

The three-point hitch mechanism 18 of the tractor 10 is a further example of a hydraulic device powered by the on-board hydraulic system 20. While the three-point hitch mechanism 18 is conventional, the operation thereof can be controlled by a microprocessor (not shown) as described in U.S. Pat. No. 5,320,186, issued on Jun. 14, 1994, to R. P. Strosser, et al, the descriptive portions of which are incorporated herein by reference. The hydraulic demands of the electronic three-point hitch control mechanism is are provided through a separate hydraulic valve 29, which can be referred to as the electronic draft control (EDC) valve 29.

The horsepower requirements of any particular load imposed on the hydraulic system is directly proportional to the product of the of the flow and pressure requirements of the imposed load. Typically, some hydraulic devices, such as cylinders, will require high hydraulic pressure, but only low flow requirements. Other hydraulic devices, such as hydraulic motors, will require a lower hydraulic pressure, but a large flow of hydraulic fluid. Of the on-board hydraulic mechanisms described above, the electronically controlled three-point hitch mechanism 18 requires a relatively high hydraulic pressure to operate, but generally does not require much flow as the adjustments made by the electronic system are normally rather minute and does not generally require a large displacement of hydraulic fluid. The steering mechanism has different requirements as the steering cylinder may require considerable displacement for its operation, but a lower hydraulic operating pressure is utilized.

Figure 2:
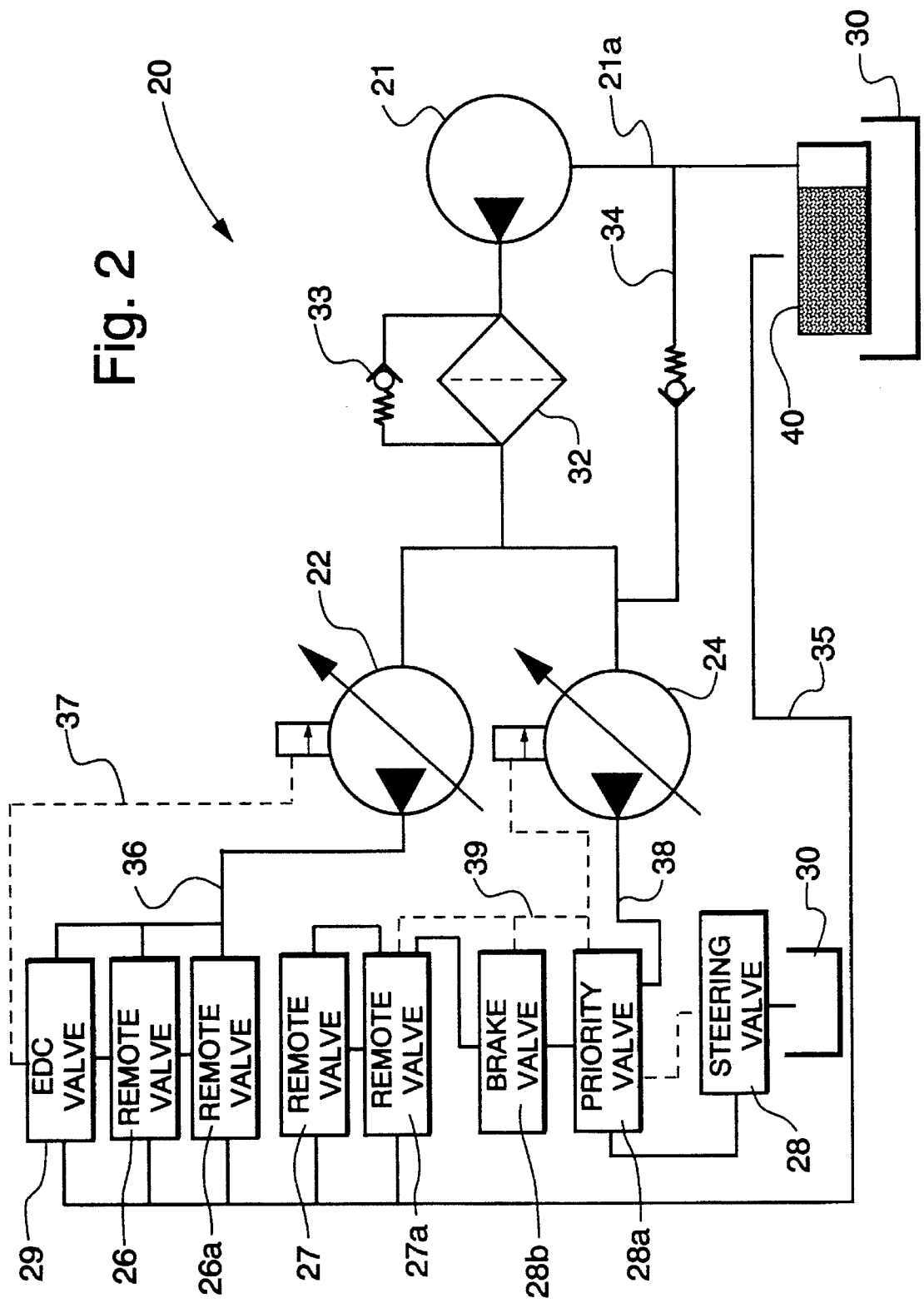
FIG. 2 is a schematic diagram representing the hydraulic system incorporating the principles of the instant invention.
Figure 3:
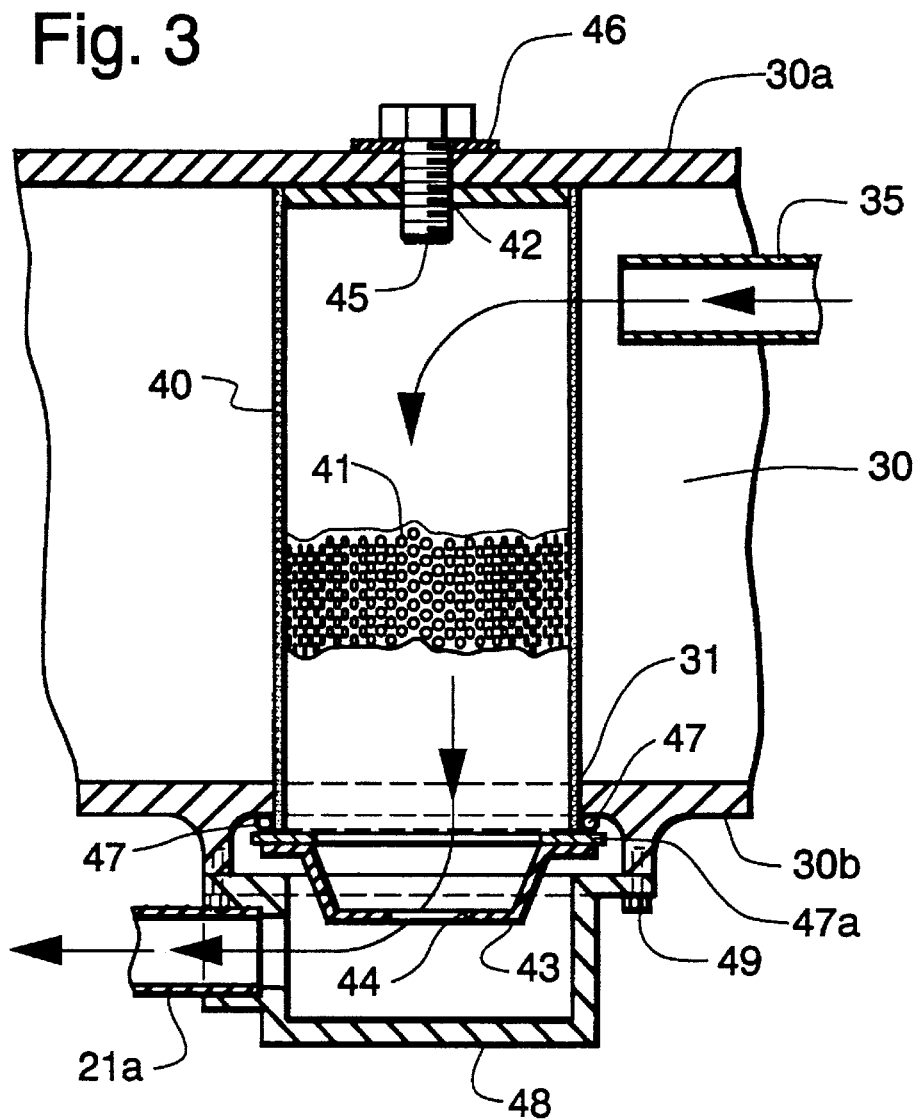
FIG. 3 is a partial cross-sectional view through the hydraulic system reservoir taken along lines 3—3 of FIG. 1 to better depict the details of the screen member, portions of the screening material being broken away for purposes of clarity.
Figure 4:
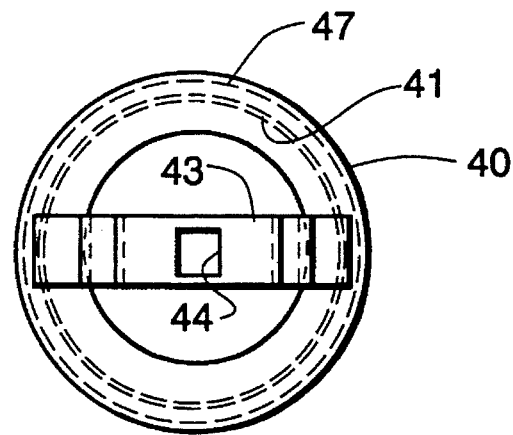
FIG. 4 is an end view of the screen member depicting the handle projecting outwardly through the access opening in the reservoir wall.

Referring now to FIGS. 1 and 2, but primarily FIG. 2, the hydraulic system 20 can be seen in greater detail. The charge pump 21 supplies a substantially constant supply of hydraulic fluid from a reservoir 30 through a filter 32, or through a pressure relief valve 33 in the event the filter 32 becomes clogged, to the variable displacement piston pumps 22, 24. A re-circulating line 34 allows the return of excess hydraulic fluid to the charge pump 21. The upper piston pump 22 provides a supply of fluid through the supply line 36 to the remote valves 26, 26a and to the EDC valve 29 with a return line 35 returning the flow of hydraulic fluid back to the reservoir 30. A conventional load sensing line 37 operatively interconnecting the valves 26, 26a and 29 controls the variable displacement of the piston pump 22 in a conventional manner. In general terms, the demand for hydraulic fluid is sensed by the pump 22 through the load sensing line 37 and varies the stroke of the piston pump accordingly to increase the flow therefrom.

The lower piston pump 24 supplies hydraulic fluid under pressure through the supply line 38 to a priority valve 28a, which diverts hydraulic fluid to the steering valve 28 when demanded, and then to an optional trailer brake valve 28b and the remote directional valves 27, 27a. The return line 35 also directs the return flow of fluid from the lower pump 24 back to the reservoir 30. As with the upper piston pump 22, a load sensing line 39 conveys the demand for hydraulic fluid flow to the lower pump 24 which increases displacement accordingly in a conventional manner.

For proper utilization of the above-described dual pump hydraulic system 20, the operator should group his remote hydraulic devices according to high pressure/low flow and low pressure/high flow categories. The remote hydraulic devices requiring high pressure, but low flow, should be connected to the remote valves 26 or 26a associated with the upper piston pump 22. Likewise, the low pressure, but high flow, hydraulic devices should be connected to the remote valves 27 or 27a associated with the lower piston pump 24. Each respective piston pump 22, 24 will provide hydraulic fluid under pressure as demanded by the respective devices, while each pump 22, 24 can operate at maximum efficiency without having to satisfy both high pressure and high flow requirements. As a result, less heat is generated within the hydraulic system and lower cooling capability needs to be provided.

For those hydraulic devices requiring a greater flow of hydraulic fluid than either of the piston pumps 22, 24 can individually provide, such as a large hydraulic orbit motor, the operator can interconnect the couplings of one of the remote valves 26, 26a associated with the upper piston pump 22 and the couplings of one of the remote valves 27, 27a associated with the lower piston pump 24 by a secondary coupling device (not shown) to combine the flows from both pumps 22, 24 into a single hydraulic line (not shown). This secondary coupling device would connect externally to each of the respective groups of remote valves 26, 27. As a result, the hydraulic system 20 can provide a maximum total flow of approximately 57 gallons per minute.

Referring to FIGS. 1–4, the reservoir 30 is preferably the center housing 17 for the rear wheels 19 in which is located the drive gears (not shown) from transferring rotational power from the engine 12 to the rear wheels 19 for driving the mobile operation of the tractor 10. By using the center housing 17, the drive gears will have a readily available supply of fluid for lubricating the interengagement of the drive gears. The reservoir 30 has laterally opposing structural walls 30a, 30b defining the lateral width of the reservoir 30. One of the walls 30a is provided with a stationary stud 45 fixed to the wall 30a for mounting the screen member 40 in a manner defined in greater detail below. A sealing washer 46 associated with the stationary stud 45 seals off any leakage past the stud 45. The opposing wall 30b is formed with an access opening 31 for entry into the reservoir 30.

The hydraulic system 20 is also provided with a screen member 40 preferably formed in a cylindrical shape from screening material 41. The screen member 40 is formed with a threaded opening 42 at one end for engagement with the stationary stud 45 for the mounting of the screen member 40 in its operative position. The screen member 40 is also provided with an opposing handle 43 preferably formed as a loop extending outwardly away from the screening material 41. The handle 43 can be formed with an optional square hole 44 stamped into the handle 43 to allow engagement therewith by a standard ½ inch drive ratchet head to rotate the screen member 40 mechanically.

For mounting, the cover member 48 is removed from the reservoir wall 30b by first removing the fasteners 49 and then the screen member 40 is inserted through the exposed access opening 31 until the threaded opening 42 is engaged with the stationary stud 45 in the opposing wall 30a. By rotating the screen member 40, the screen member 40 will advance along the stationary stud 45 until pressed against the reservoir wall 30a with the handle 43 projecting externally of the reservoir wall 30b.

A conventional thread sealant (not shown) placed on the threads of the stud 45 before engaging the screen member 40, or an alternative sealing member (not shown) located between the screen member 40 and the wall 30a, prevents hydraulic fluid from leaking past the stationary stud 45 to the interior of the screen member 40. Once the screen member 40 is properly positioned and tightened against the wall 30a, an O-ring seal 47 compressed between a flange 47a affixed to the screen member 40 and the outside of the reservoir wall 30b prevents leakage of hydraulic fluid through the access opening 31 between the screen member 40 and the wall 30b.

The return line 35 is routed through the reservoir 30 to terminate adjacent the screen member 40 such that the hydraulic fluid returning therethrough is directed immediately onto the screening material 41. In this manner, the contaminates are best filtered from the flow of hydraulic fluid. The intake line 21a draws hydraulic fluid from the interior of the screen member 40 through the cover member 48 and to the charge pump 21. All hydraulic fluid being re-circulated back through the charge pump 21 is then filtered immediately before being drawn into the intake line 21a.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a wheeled chassis adapted for movement over the ground; an engine supported on said chassis for providing operative power for said tractor; and a hydraulic system operably powered by said engine and having a plurality of remote couplers supported from said chassis for remote connection thereto, said hydraulic system further including a reservoir having first and second spaced-apart walls, a pump drawing hydraulic fluid through an intake line from said reservoir to provide a flow of hydraulic fluid under pressure to the remote couplers, and a return line to return hydraulic fluid from said remote couplers to said reservoir, the improvement comprising:

a screen member housed within said reservoir and being detachably mounted on a stationary stud affixed to said first reservoir wall and further being formed of screening material positioned to filter the flow of hydraulic fluid from said reservoir into said intake line, said intake line drawing hydraulic fluid from inside said screen member to effect a filtering of said hydraulic fluid through said screening material before being drawn into said intake line.

2. The tractor of claim 1 wherein said screen member can be inserted through an access opening in said second reservoir wall aligned with said stationary stud, said screen member carrying a seal to prevent the flow of hydraulic fluid through said access opening around the exterior of said screen member.

3. The tractor of claim 2 wherein said stationary stud is threaded, said screen member including a threaded opening corresponding to said stationary stud to thread said screen member on said stationary stud.

4. The tractor of claim 3 wherein said screen member further includes a handle opposingly located relative to said threaded opening to facilitate the rotation of said screen member to threadably engage said stationary stud.

5. The tractor of claim 4 wherein said return line terminates adjacent said screen member to direct hydraulic fluid returning from said remote couplers directly onto said screening material such that said screen member serves to diffuse hydraulic oil returning from said remote couplers.

6. The tractor of claim 4 wherein said handle is adapted for engagement with a tool to effect rotation of said screen member.

7. In a tractor having a wheeled chassis adapted for movement over the ground; an engine supported on said chassis for providing operative power for said tractor; and a hydraulic system operably powered by said engine and having a plurality of remote couplers supported from said chassis for remote connection thereto, said hydraulic system further including a reservoir having first and second spaced-apart walls, a pump drawing hydraulic fluid through an intake line from said reservoir to provide a flow of hydraulic fluid under pressure to the remote couplers, and a return line to return hydraulic fluid from said remote couplers to said reservoir, the improvement comprising:

a screen member positioned within said reservoir and being detachably mounted on a stationary stud affixed to said first reservoir wall, said screen member being positioned adjacent said return line so that hydraulic fluid returning from said remote couplers is diffused by said screen member within said reservoir.

8. The tractor of claim 7 wherein said intake line draws hydraulic fluid from inside said screen member to effect a filtering of said hydraulic fluid through said screening material before being drawn into said intake line.

9. The tractor of claim 8 wherein said screen member can be inserted through an access opening in said second reservoir wall aligned with said stationary stud, said screen member carrying a seal to prevent the flow of hydraulic fluid through said access opening around the exterior of said screen member.

* * * * *